Figure 1:
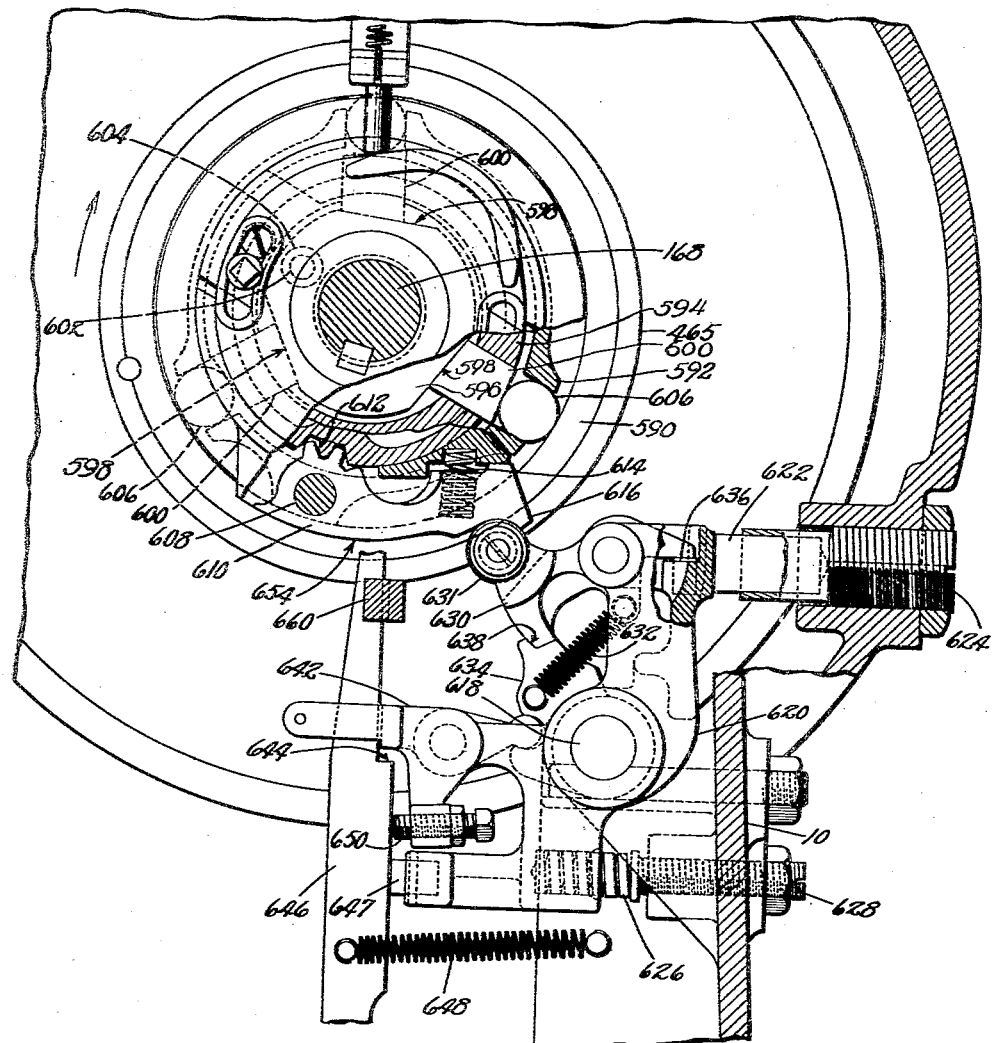

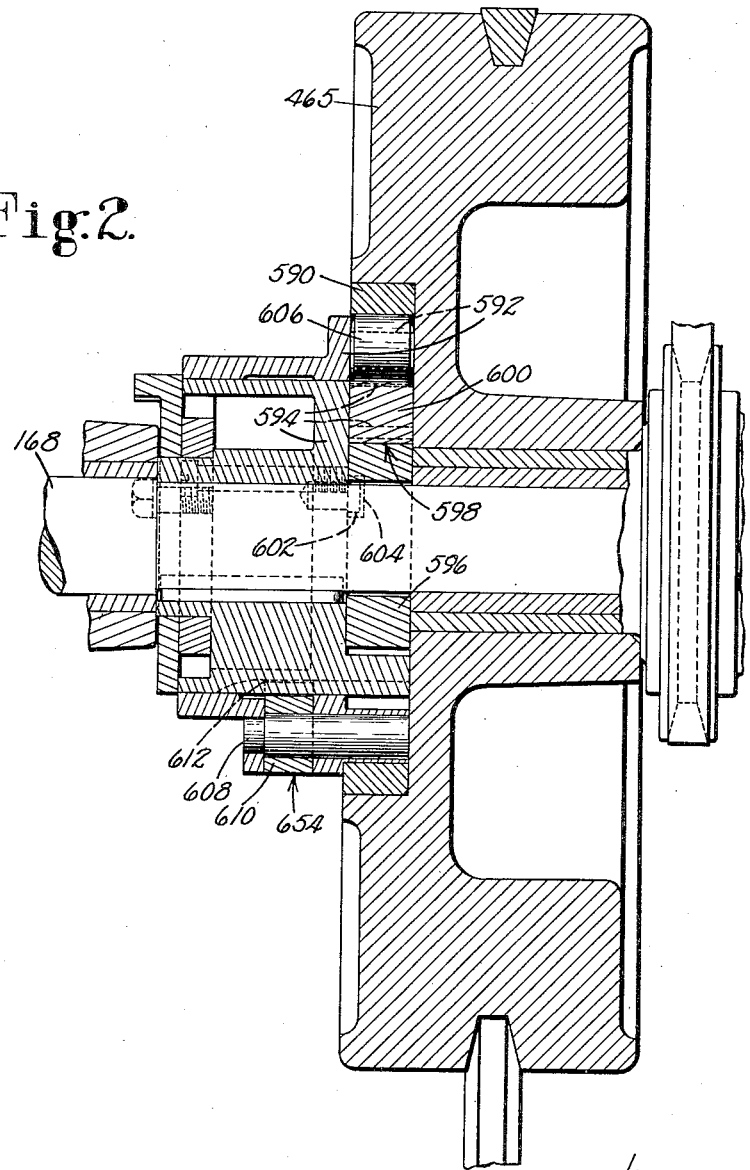

Patented Nov. 7, 1939

2,178,616

UNITED STATES PATENT OFFICE 2,178,616

CLUTCH

John F. Standish, Winthrop, and Lester S. Macdonald, Beverly, Mass., assignors to United Shoe Machinery Corporation, Borough of Flemington, N. J., a corporation of New Jersey Original application May 28, 1937, Serial No. 145,320. Divided and this application October 1, 1937, Serial No. 166,863

15 Claims. (Cl. 192—149)

This invention relates to clutches and is especially concerned with those of the Horton type. The present case is a division of an application for improvements in Fastening-inserting machine, filed in our names in the United States Patent Office on May 28, 1937, with the Serial No. 145,320.

An object of the invention is to improve generally the structure of such clutches and, more particularly, to stop the rotation of the element driven by the clutch at a definite point without substantial shock and by simple and compact controlling means. In the attainment of this object, there is combined with driving and driven connecting members a roll-cage and a wedge-cage, with their rolls and wedges, said wedges having at their opposite ends differently inclined faces, which render them reversible. The wedge-cage is secured to one of the connecting members, and the rolls engage the other member and inclined ends of their respective wedges, while the opposite inclined wedge-ends contact with faces upon an abutment member. By virtue of the reversibility of the wedges, both ends may be utilized to receive the engagement of the rolls, and thus the life of said wedges extended. The connecting members, regardless of the form of clutch in which they may be embodied, are movable relatively to each other, circumferentially of driving and driven elements which they join, and a controlling member is movable upon one of the connecting members to clutch and unclutch them. This controlling member engages a contact member to first unclutch the connecting members and then to stop their rotation, the contact member being preferably mounted to yield. Herein, the controlling member is shown as under the influence of a series of successively effective levers, all arranged upon a yieldable carrier-lever. Of this series, an actuating lever is movable by a member shifted by the operator and arranged to release itself, after it has functioned, from said member; a latching lever movable by the actuating lever; and a third lever, upon which is the contact member more directly affecting the controlling member of the clutch and normally maintained in active clutch-disengaging position by the latching lever. When this unclutching action occurs, the driven element is arrested in a predetermined position by the engagement of the controlling member with the contact member, the shock being cushioned by the yield of the carrier-lever with the entire series of intermediate levers which it bears. A single spring, joining the latching lever and contact-lever, may be caused to produce certain movements of both.

The drawings illustrate one form of the clutch of this invention,

Fig. 1 being a side elevation, with parts broken away; and

Fig. 2, a central, vertical, transverse section.

The clutch is of the Horton type, it being shown as having a ring 590 carried by a pulley 465 which furnishes the driving element, turning in the direction indicated by the arrow in Fig. 1. Within the ring are arranged concentrically a roll-cage 592 and a wedge-cage 594, the former cage turning about the latter. The wedge-cage is keyed to a shaft 168, which is the driven element and is rotatable in a frame 10. Free to play radially about the shaft is an abutment-ring 596 provided at its periphery with three inclined surfaces 598. With these surfaces contact complementally inclined surfaces upon wedge members 600 mounted to move radially in ways in the cage 594. A projection 602 from the wedge-cage lies in an opening 604 in the abutment member with considerable clearance, holding these elements in approximately the correct relation but with a capacity for relative movement. The outer ends of the wedges are inclined oppositely to the inner, so the surfaces converge, lying at substantially the same angle to a median plane, and engage rolls 606 movable radially in ways in the cage 592. Attached to the driving roll-cage by a pivot 608 is a clutch-lever 610, which has toothed engagement at 612 with the wedge-cage which is to be driven. An expansion-spring 614 interposed between the wedge-cage and the lever exerts a force tending to throw a radially projecting end 616 of said lever outwardly. When this is permitted, relative movement between the roll-cage and wedge-cage is caused by the engagement of the lever 610 with both. This results in the inner ends of the wedges being forced against the abutment-surfaces 598 and the outer surfaces against the rolls 606, which are urged against the ring 590. The pulley 465 and shaft 168 are thus clutched together, so the shaft is driven. The abutment member 596 turns with the wedges, and its capacity for adjusting itself in all directions radially creates equal pressure of all the rolls upon the ring and insures uniformly firm engagement with minimum wear. When, in use, repeated driving contact of the rolls with the outer ends of the wedges deforms the latter, said wedges, because of the inclination of both ends, may be reversed, and their life thus doubled.

The driving action of the clutch is normally prevented by holding the end 616 of the lever 610 in against the force of the spring 614 to so retain the cages that the wedges are out of clutching engagement. Fulcrumed at 618 on the frame 10 is a carrier-lever 620, which is normally held against a bumper 622 backed by an adjusting screw 624 threaded through the frame. The carrier-lever is urged against the bumper by an expansion-spring 626 adjustable by a screw 628 as to the force exerted. Supported by the carrier-lever is a chain of three successively acting levers. At its upper extremity, a contact-lever 630 is pivoted, this having rotatable upon it a roll 631 drawn into the path of the lever-end 616 by a tension-spring 632. This spring joins the lever 630 to a latching lever 634, which turns about the pivot 618 of the carrier-lever. The action of the spring 632 is to hold the lever 630 normally against a stop 636 upon the carrier-lever, while the lever 634 is drawn against the lever 630 at 638. Under these conditions, the roll 631 of the lever 630 is in the path of the clutch-lever-end 616. The clutch-lever is thereby held in to disengage the clutch. To withdraw the roll 631 and allow the spring 614 to produce engagement of the clutch, an actuating lever 642 is fulcrumed upon the carrier-lever 620. This lever 642 at its rear extremity has a rounded end occupying a depression in a short, forwardly extending arm of the intermediate latching lever 634. An opposite arm is arranged for engagement at its under side with a shoulder 644 near the upper end of a bar 646 rising from an unillustrated treadle. The shoulder of the bar is drawn yieldably beneath the lever against a bumper 647 upon the carrier-lever 620 by a tension-spring 648 connecting it to the frame. A screw 650 threaded through a depending portion of the lever 642 bears against the bar below the shoulder to release the bar from actuating engagement with the lever when the latter is rotated in a clockwise direction, as viewed in the drawings.

Upon depression of the treadle, the bar 646 is elevated, and its shoulder 644 turns the lever 642. The spring 648 yields, allowing the bar to be displaced to the left by the screw 650, so the shoulder 644 is disengaged from the lever 642 and the clutch freed from control by the treadle. During the elevation of the bar, the lever 634 is tilted anticlockwise against the spring 632, so at 638 it releases the lever 630. This last-mentioned lever is now free to turn anticlockwise, such movement being very abruptly produced by the spring 614 overcoming the spring 632. The lever 610 therefore assumes a position in which the clutch is engaged by the relative rotary movement of the wedge- and roll-cages, so the lever 610 in its revolution leaves the roll 640. As soon as this occurs, and because the lever 642 has released itself from the bar 646, the lever 630 may be turned against its stop 636 by the spring 632, and the lever 634 shifted simultaneously to re-establish the engagement between the two levers at 638. The lever 630 and its roll 631 are thereby locked in their normal relation. The engagement of the lever 634 with the lever 642 has returned the latter to its initial position. As the clutch approaches the end of its rotation, the edge 654 of the lever 610 strikes the roll and acts as a cam to gradually disengage the clutch. Before the lever-end 616 reaches the roll, the disengagement is completed, and the contact of the end with the roll stops the rotation of the shaft 168 at a definite point. The arresting engagement of the roll with the lever-end is cushioned by the rotation of the entire controlling lever-system, the carrier-lever 620 yielding against the spring 626, which then restores it to its initial position against the bumper 622. A brake may exert a constant retarding effect upon the shaft 168 in the customary manner, to assist in bringing it promptly to rest. When the operator releases the treadle, the clutch-controlling system is restored to normal, the spring 648 carrying the bar 646 against the stop-screw 650 as the shoulder 644 of said bar assumes its initial position below the lever 642.

Having described our invention, what we claim as new and desire to secure by Letters Patent of the United States is:

1. Clutch mechanism comprising a driving member and a driven member, a roll-cage and a wedge-cage situated between said members, rolls and co-operating wedges carried by the respective cages, each wedge having at its ends differently inclined faces and being reversible, there being a roll arranged for engagement with an inclined end of each wedge and with one of the members, the wedge-cage being secured to the other of said members, and an abutment member having a face with which the other inclined end of each wedge contacts.

2. Clutch mechanism comprising a driving member and a driven member, a roll-cage and a wedge-cage situated between said members, rolls and co-operating wedges carried by the respective cages, each wedge having at its ends oppositely inclined converging faces and being reversible, there being a roll arranged for engagement with the outer inclined end of each wedge and with one of the members, the wedge-cage being secured to the other of said members, and an abutment member having faces with which the inner inclined ends of the wedges contact.

3. Clutch mechanism comprising a rotatable driving element and a rotatable driven element, connecting means between the elements including members movable relatively to each other circumferentially of the elements, a controlling member movable upon one of the connecting members to clutch and unclutch said members, and a contact member engaged by the controlling member to first unclutch the connecting members and then to positively stop their rotation at a predetermined point.

4. Clutch mechanism comprising a rotatable driving element and a rotatable driven element, connecting means between the elements including members movable relatively to each other circumferentially of the elements, a controlling member movable upon one of the connecting members to clutch and unclutch said members, and a contact member engaged by the controlling member to first unclutch the connecting members and then to stop their rotation, the contact member being mounted to yield upon such engagement.

5. Clutch mechanism comprising a rotatable driving element and a rotatable driven element, connecting means between the elements including members movable relatively to each other circumferentially of the elements, a controlling member movable upon one of the connecting members to clutch and unclutch said members, a contact member engaged by the controlling member to first unclutch the connecting members and then to stop their rotation, a pivoted carrier member upon which the contact member is mounted, a stop against which the carrier member normally rests, and a spring urging the carrier member toward the stop and yielding upon engagement of the controlling member with the contact member.

6. Clutch mechanism comprising a rotatable driving element and a rotatable driven element, connecting means between the elements including members movable relatively to each other circumferentially of the elements, a controlling member movable upon one of the connecting members to clutch and unclutch said members, a contact-lever movable into and out of the path of the controlling member, a latching lever by which the contact-lever is retained normally in its active position, and a spring joining the contact-lever and the latching lever.

7. Clutch mechanism comprising a rotatable driving element and a rotatable driven element, connecting means between the elements including members movable relatively to each other circumferentially of the elements, a controlling member movable upon one of the connecting members to clutch and unclutch said connecting members, a contact-lever movable into and out of the path of the controlling member, a latching lever by which the contact-lever is retained normally in its active position, a spring connecting the latching lever and the contact-lever and drawing said levers together, and a stop against which the spring draws the contact-lever.

8. Clutch mechanism comprising a rotatable driving element and a rotatable driven element, connecting means between the elements including members movable relatively to each other circumferentially of the elements, a controlling member movable upon one of the connecting members to clutch and unclutch said members, a contact-lever movable into and out of the path of the controlling member, a spring normally urging the contact-lever toward the path of the controlling lever, and a spring acting upon the controlling member and being of sufficient strength to overcome the force of the contact-lever-spring.

9. Clutch mechanism comprising a rotatable driving element and a rotatable driven element, connecting means between the elements including members movable relatively to each other circumferentially of the elements, a controlling member movable upon one of the connecting members to clutch and unclutch said members, a contact-lever movable into and out of the path of the controlling member, a latching lever by which the contact-lever is retained normally in its active position, and a yieldable carrier-lever upon which the contact-lever and latching lever are mounted.

10. Clutch mechanism comprising a rotatable driving element and a rotatable driven element, connecting means between the elements including members movable relatively to each other circumferentially of the elements, a controlling member movable upon one of the connecting members to clutch and unclutch the connecting members, a contact-lever movable into and out of the path of the controlling member, a latching lever by which the contact-lever is retained normally in its active position, a member movable by the operator, and an actuating lever movable by such member and having engagement with the latching lever to release the contact-lever.

11. Clutch mechanism comprising a rotatable driving element and a rotatable driven element, connecting means between the elements including members movable relatively to each other circumferentially of the elements, a controlling member movable upon one of the connecting members to clutch and unclutch said members, a contact-lever movable into and out of the path of the controlling member, a latching lever by which the contact-lever is retained normally in its active position, a member movable by the operator, and an actuating lever movable by said member and having engagement with the latching lever to release the contact-lever, the actuating lever upon movement acting upon the operator-controlled member to free itself therefrom.

12. Clutch mechanism comprising a rotatable driving element and a rotatable driven element, connecting means between the elements including members movable relatively to each other circumferentially of the elements, a controlling member movable upon one of the members to clutch and unclutch said members, a contact-lever movable into and out of the path of the controlling member, a latching lever by which the contact-lever is retained normally in its active position, an actuating lever for the latching lever, and a yieldable carrier upon which the three levers are mounted.

13. Clutch mechanism comprising a rotatable driving element and a rotatable driven element, connecting means between the elements including members movable relatively to each other circumferentially of the elements, a controlling member movable upon one of the connecting members to clutch and unclutch said members and provided with a cam-surface and a projection, and a contact member first engaged by the cam-surface of the controlling member to unclutch the connecting members and thereafter engaged by the projection to stop their rotation.

14. Clutch mechanism comprising a rotatable driving element and a rotatable driven element, connecting means between the elements including members movable relatively to each other circumferentially of the elements, a controlling lever fulcrumed upon one of the connecting members to clutch and unclutch said members, said lever having toothed engagement with the other connecting member, and a contact member engaged by the lever to first unclutch the connecting members and then to stop their rotation.

15. Clutch mechanism comprising a rotatable driving element and a rotatable driven element, connecting means between the elements including members movable relatively to each other circumferentially of the elements, a controlling lever fulcrumed upon one of the connecting members to clutch and unclutch said members, said lever being provided with a cam-edge and with a projecting extremity, and a contact member engaged successively by the cam-edge of the lever and by its projection.

JOHN F. STANDISH.
LESTER S. MACDONALD.